United States Patent
Chiang et al.

(10) Patent No.: US 10,498,893 B2
(45) Date of Patent: *Dec. 3, 2019

(54) GUARD TIMER TO OPTIMIZE E911 CALL HANDLING

(71) Applicant: T-Mobile USA, Inc., Bellevue, WA (US)

(72) Inventors: Hsin-Fu Henry Chiang, Bellevue, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,767

(22) Filed: Aug. 31, 2018

(65) Prior Publication Data

US 2018/0375996 A1  Dec. 27, 2018

Related U.S. Application Data

(63) Continuation of application No. 15/665,272, filed on Jul. 31, 2017, now Pat. No. 10,084,914.

(Continued)

(51) Int. Cl.
*H04M 3/51* (2006.01)
*H04M 3/428* (2006.01)
(Continued)

(52) U.S. Cl.
CPC ....... *H04M 3/5116* (2013.01); *H04M 3/4288* (2013.01); *H04M 7/0078* (2013.01);
(Continued)

(58) Field of Classification Search
CPC ............. H04M 3/5116; H04M 7/0078; H04M 7/0084; H04M 3/4288; H04M 11/04; H04W 76/068
See application file for complete search history.

(56) References Cited

U.S. PATENT DOCUMENTS 6,359,970 B1   3/2002 Burgess
8,244,204 B1 *  8/2012 Chen ................. H04M 3/42195
                                          379/114.28

(Continued)

OTHER PUBLICATIONS

Office Action for U.S. Appl. No. 15/665,287, dated Sep. 14, 2018, Nimbavikar et al, "Optimized Call Handling During E911 Calls", 11 pages.

(Continued)

*Primary Examiner* — Stella L. Woo
(74) *Attorney, Agent, or Firm* — Lee & Hayes, P.C.

(57) ABSTRACT

Systems and methods for optimized call handling during e911 calls. Normally, when a user equipment (UE) is connected to a public safety answering point (PSAP)—e.g., is on a 911 call—all incoming calls are automatically routed to voicemail. In contrast, the systems and methods disclosed herein enable calls that were dialed within a predetermined time window of the 911 call to be sent through to call-waiting to enable the user to accept or reject the call. The system can use a "guard timer" to determine whether a call is within the predetermined time window. The system can include a single guard timer for all incoming calls—e.g., "any call made from the UE within the previous X minutes prior to the 911 call." The system can also include individual guard timers for each call that expire separately relative to the call's proximity to the 911 call.

26 Claims, 8 Drawing Sheets

Related U.S. Application Data

(60) Provisional application No. 62/476,367, filed on Mar. 24, 2017.

(51) Int. Cl.
  *H04M 11/04* (2006.01)
  *H04M 7/00* (2006.01)
  *H04W 76/38* (2018.01)
  *H04W 4/90* (2018.01)
  *H04W 4/16* (2009.01)

(52) U.S. Cl.
  CPC ......... *H04M 7/0084* (2013.01); *H04M 11/04* (2013.01); *H04M 11/045* (2013.01); *H04W 4/90* (2018.02); *H04W 76/38* (2018.02); *H04M 2203/2005* (2013.01); *H04W 4/16* (2013.01)

(56) References Cited

U.S. PATENT DOCUMENTS

| | | | |
|---|---|---|---|
| 8,588,375 | B1 | 11/2013 | Shashindranath et al. |
| 8,848,878 | B2 | 9/2014 | Peddie et al. |
| 8,965,325 | B2 * | 2/2015 | Li .................... H04M 3/42195 379/37 |
| 9,513,867 | B1 | 12/2016 | Tokunaga |
| 10,084,914 | B1 * | 9/2018 | Chiang ................ H04W 76/38 |
| 2002/0141559 | A1 | 10/2002 | Gurgun |
| 2003/0191676 | A1 | 10/2003 | Templeton |
| 2005/0096008 | A1 | 5/2005 | Shin |
| 2005/0243974 | A1 | 11/2005 | Pearson |
| 2007/0041516 | A1 | 2/2007 | Dickinson |
| 2007/0116233 | A1 | 5/2007 | Onorato |
| 2008/0214141 | A1 | 9/2008 | Burdick et al. |
| 2008/0305763 | A1 | 12/2008 | Wijayanathan et al. |
| 2010/0261492 | A1 | 10/2010 | Salafia et al. |
| 2010/0316208 | A1 | 12/2010 | Langos |
| 2011/0026440 | A1 | 2/2011 | Dunn et al. |
| 2013/0045708 | A1 | 2/2013 | Nguyen et al. |
| 2013/0333020 | A1 | 12/2013 | Deshpande |
| 2014/0199957 | A1 | 7/2014 | Hursey et al. |
| 2016/0269549 | A1 | 9/2016 | Chandra |
| 2016/0278132 | A1 | 9/2016 | Baek et al. |
| 2018/0097934 | A1 | 4/2018 | Yalamanchili |
| 2018/0278747 | A1 | 9/2018 | Chiang et al. |
| 2018/0302450 | A1 | 10/2018 | Nimbavikar et al. |
| 2019/0037075 | A1 | 1/2019 | Nimbavikar et al. |

OTHER PUBLICATIONS

PCT Search Report and Written Opinion dated Oct. 31, 2018 for PCT Application No. PCT/US18/43336, 12 pages.

Office Action for U.S. Appl. No. 15/665,272, dated Jan. 25, 2018, Chiang, Guard Timer to Optimize E911 Call Handling, 9 pages.

Office action for U.S. Appl. No. 15/665,287, dated Nov. 30, 2017, Nimbavikar, "Optimized Call Handling During E911 Calls", 10 pages.

Office action for U.S. Appl. No. 15/665,287, dated May 14, 2018, Nimbavikar, "Optimized Call Handling During E911 Calls", 11 page.

PCT Search Report and Written Opinion dated Jul. 30, 2018, for PCT Application No. PCT/US18/23720, 14 pages.

Technical Specification, "3GPP TS 26.267 V14.0.0", 3GPP A Global Initiative, dated Mar. 17, 2017, retrieved from : https://portal.3gpp.org/desktopmodules/Specifications/SpecificationDetails.aspx?specificationId=1445 . Section 4.1, figure 1, 37 pages.

Office Action issued for U.S. Appl. No. 15/665,287, dated Jan. 25, 2019, Nimbavikar, "Optimized Call Handling During E911 Calls" (14 pages).

Office action for U.S. Appl. No. 15/665,250, dated Jun. 5, 2019, Nimbavikar, "Systems and Methods for Improved E911 Call Handling", 19 pages.

* cited by examiner

GUARD TIMER TO OPTIMIZE E911 CALL HANDLING

CROSS REFERENCE TO RELATED APPLICATIONS

The present disclosure is a continuation of, and claims priority under 35 U.S.C. § 120 to, U.S. patent application Ser. No. 15/665,272, filed Jul. 31, 2017, which is a non-provisional of, and claims priority under 35 USC § 119(e) to, U.S. Provisional Patent Application No. 62/476,367, filed Mar. 24, 2017, the entire disclosures of which are hereby incorporated by reference in their entirety.

BACKGROUND

The enhanced 911 (e911) service was developed in response to the increasingly mobile nature of modern communications. e911 enables a user to dial 911 and be connected to the appropriate emergency services regardless of their location. Obviously, there cannot be a single callback number because a cellular caller who hails from Atlanta, Ga., but calls 911 while they are in New York City, N.Y. does not want to be connected to emergency services in Atlanta. To this end, some enhancements were needed to enable callers to be ready for local emergency callback services based on any location.

Currently, if a user dials 911 from a cellular or internet protocol (IP) based communications device (e.g., a cell phone, smart phone, laptop, tablet, etc.), they are routed to local emergency services using the location provided by the cell tower or wireless router to which they are connected. Due to the somewhat limited range of both of these communications methods, the location provided is generally specific enough for routing purposes. In other words, in most cases, the area covered by a particular cell tower, for example, is also covered by a single, or a small number of, emergency service providers. Thus, the network may have primary and secondary PSAP locations for the same location and cell tower, for example, with different callback numbers for each PSAP location.

When a user dials 911, however, the user is generally unable to receive calls or call-waiting notification—all calls including PSAP callback from previous 911 call attempt are automatically rejected by the user equipment (UE) and/or the network. In addition, no explanation is provided to incoming callers as to why the call was rejected. Generally, the call simply rings or goes immediately to voicemail.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
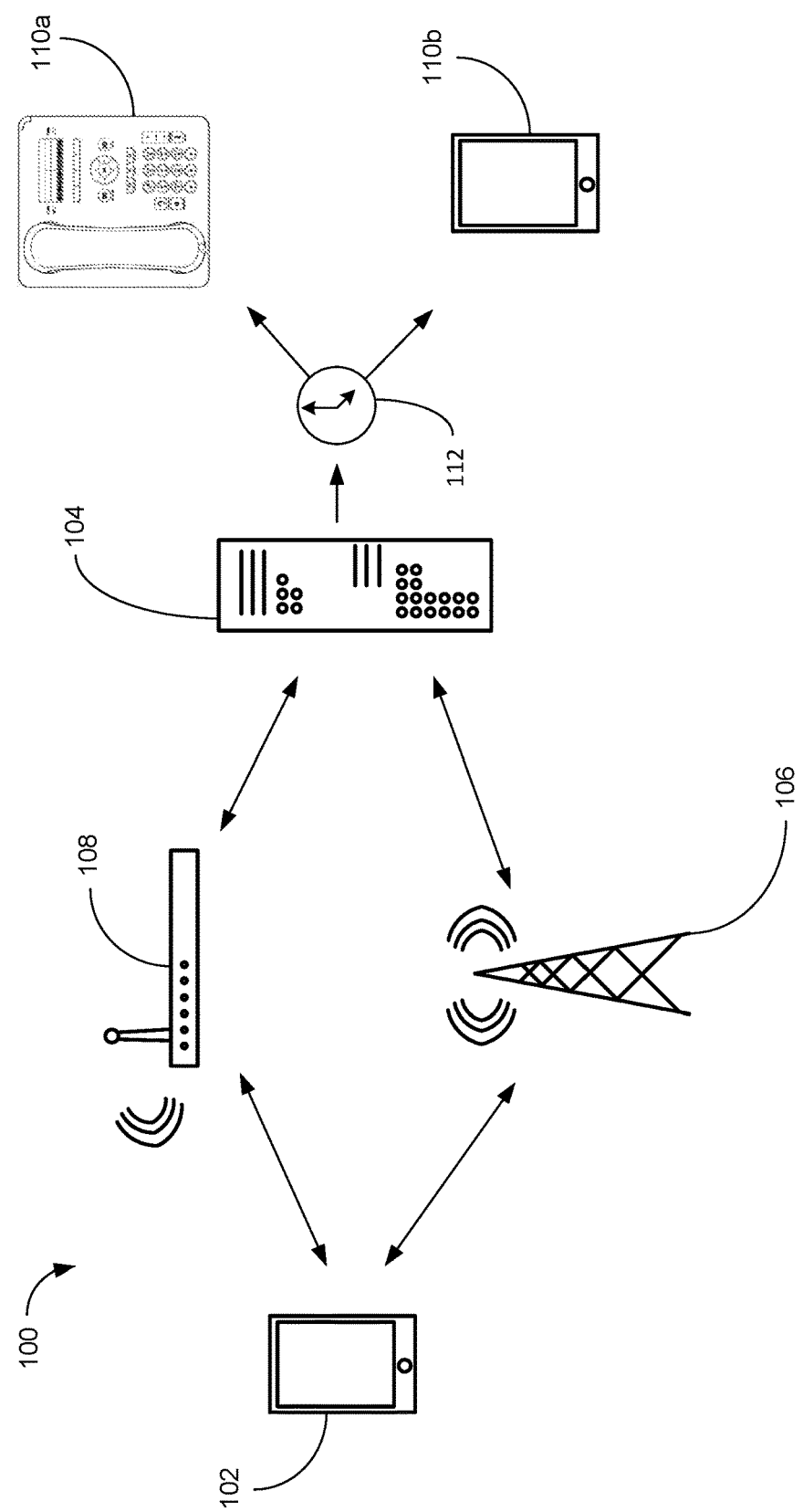
FIG. 1 depicts an example of a system for optimized call handling during enhanced 911 (e911) calls including a user equipment (UE) connected to an Internet Protocol Multimedia Core Network Subsystem ("IMS") with multiple caller categories, in accordance with some examples of the present disclosure.

As mentioned above, currently, when a user dials 911 from a device that utilizes enhanced 911 (e911) services such as, for example, a cell phone, smart phone, laptop, or tablet computer, that devices cannot simultaneously receive another call. In other words, in an effort to protect users from distractions during an emergency, the user equipment (UE) and/or network disables call-waiting and/or other features. If a caller calls the user during an e911 call, therefore, the call simply rings from the caller's side or is sent straight to voice-mail. The user is unaware that the caller has called.

This feature can prevent users from being distracted during a 911 call and from accidentally hanging up on emergency services during a 911 call as they try to switch between the incoming call and the 911 call, among other things. There may be times, however, when the user would like to receive an important call even though they are on a 911 call. Indeed, in some situations, the incoming call may resolve the issue about which the user is calling 911 in the first place.

One example is when a user calls a public safety answering point (PSAP)—i.e., the service provider that is called when the user dials 911—and hangs up, is put on hold, or is disconnected. The user may then redial the PSAP in an attempt to complete the call. In the meantime, based on the previous call (i.e., caller ID) from the user, the PSAP may attempt to call the user back. In this case, it would be convenient for the user to be able to hang up the second 911 call and take the incoming call from the PSAP. This can avoid both (1) the delay associated with calling the PSAP back on the second call and any associated hold time and (2) the redundancy of two emergency operators connected with the same caller on two different lines.

In a similar scenario, a user may call his doctor in an emergency situation with which the doctor is already familiar (e.g., a heart condition). When the call goes unanswered, the user may then dial 911. If, while the user is on the call with 911, the doctor calls back, it would be useful to notify the user to this fact. The user may be able to hang up with 911 and speak to the doctor, which may enable a more efficient resolution of the pending emergency. The doctor may be able to recommend a dosage change, or other solution, that at least temporarily resolves the issue.

As another example, a user may call a child's cell phone, for example, looking for the child. If the user is unsuccessful for some period of time, the user may call 911 to report the child missing. Obviously, if the child calls the user during the 911 call, it would be beneficial for the user to receive that call. This would obviously be a relief for the parent of a missing child, but can also prevent emergency resources from being unnecessarily committed. The user could simply receive the call from the child and "cancel" the report to 911.

To this end, it would be useful for call-waiting (and perhaps other features) to be enabled for recently dialed calls. So, for example, if a user dials a first call and then hangs up and dials a second call to 911, then a retroactive "guard timer" can be activated. The retroactive guard timer basically says, "any call that was made in the previous X amount of time prior to this 911 call will be put through, all other calls will be handled in the usual manner (e.g., sent directly to voicemail)." This may be based purely on the call history log of the user's UE, for example.

If the first caller calls back within the predetermined time associated with the retroactive guard timer, then that caller can be put through to the user (e.g., to call-waiting), even though the user is currently on a 911 call. Calls that were made outside the retroactive guard timer can simply ring, be sent directly to voicemail, etc.—i.e., however calls are normally handled when a user places a 911 call (the "usual manner"). So, for example, assume the retroactive guard timer is set to 180 seconds and the user calls Caller 1 at 09:45:30 AM, Caller 2 at 10:27:35 AM, and then calls 911 at 10:27:55 AM. If Caller 1 calls the user back while the user is on a 911 call, then Caller 1 is handled in the usual manner. Caller 2, on the other hand, is put through because 25 seconds (the time between the call to Caller 1 and the 911 call) is within the 180 second retroactive guard timer.

It may also be useful, however, to have a proactive guard timer. In other words, if the user dials 911 and hangs up, a proactive guard timer is triggered. If the user then calls 911 again, any call that comes in subsequent to the second 911 call and within the proactive guard timer limit (e.g., 180 seconds) is put through to the user. So, as an example, if the user calls 911 at 10:27:30 AM and then hangs up at 10:27:55 AM, a proactive guard timer is started based on the user hanging up the first 911 call. If the user then calls 911 again at 10:28:45 AM, all calls that come in until the guard timer expires at 10:30:55 AM (180 seconds from when the user hung up from the first 911 call) will be put through. After 10:30:55 AM, if the user is still on the 911 call, all calls will be handled in the usual manner. This may be useful as it is likely that Caller 2 is the PSAP calling back based on the initial 911 call.

Example of the present disclosure, therefore, can comprise a guard timer system 100 to enable call-waiting to be enabled for (1) recently dialed numbers within a retroactive guard timer when a user is on an e911 call or (2) calls within a proactive guard time when a user is on a second e911 call—rather than just being sent to voicemail or disconnected. As shown, the UE 102 can connect to the Internet Protocol Multimedia Core Network Subsystem ("IMS") 104 via one or more cell towers 106 (for a cellular call) or a wireless router 108 (for an internet protocol, or IP, call), among other things. As mentioned above, however, when the UE 102 is connected on an e911 call, the UE 102 is generally unable to receive calls because call-waiting is inactive. This is intended to prevent the user from accidentally hanging up in the emergency call, or otherwise be distracted during an emergency.

For some callers, however, it may be desirable to inform the user (via the UE 102) that the caller is someone the user recently tried to contact. This can enable the user to accept the incoming call, if desired. In the example above, if the caller is redialing 911 and the incoming call is the PSAP calling back, for example, the user may wish to hang-up on the current call to take the incoming call from the PSAP. Thus, the user is connected directly to the PSAP, saving the time of waiting for another operator on the second 911 call, and the PSAP is saved from having two operators connected to the same user at the same time.

In some cases, the guard timer system 100 can be a function of the UE 102. In other words, an application ("app") or the operating system (OS) of the UE 102 can include a feature that detects when the user dials 911, disables call-waiting in general, and enables the guard timer. Thus, when a caller 110 calls during an e911 call, the UE 102 can automatically either send the caller 110 to voicemail or activate call-waiting, for example, depending on whether the user previously tried to contact the caller. Thus, most calls can be handled in the usual manner, while call-waiting can be activated for the user's cardiologist who the user tried to call two minutes ago, for example.

In other examples, guard timer functionality can be controlled by the IMS 104. A number of "back-end" components of the IMS 104 could be responsible for determining whether the user recently dialed a caller, determining that the guard timer has not expired, and then activating call-waiting as appropriate. In other examples, the mobile switching center (MSC), which handles end-to-end connections anyway, could be used to maintain the guard timer, check the call history, and route the call either directly to voicemail or to the UE 102 with a code (e.g., a session initiation protocol (SIP) code) to trigger call-waiting on the UE 102. In other words, because the MSC generally handles routing for voice calls, the MSC may already be aware that the user has dialed 911. Thus, the MSC can detect that the user has dialed 911, check the guard timer, and check the caller against the call history—e.g., the list of calls placed within the predetermined guard timer window and then act accordingly.

In other examples, the system 100 can be a function of a telephone application server (TAS). In some examples, when a user dials 911, the TAS can receive a message (e.g., a SIP message) indicating that the UE 102 is connected to a PSAP. If a user receives a call during this time, the TAS can determine if a guard timer is set and, if so, compare the caller to the history of recent callers. While the user is connected to the PSAP, therefore, only calls from a sufficiently recent caller cause the call-waiting on the UE 102 to be activated. Other callers who the user has not dialed called or dialed recently are handled in the usual manner.

It should be noted that, at present, there is no SIP message that enables the UE 102 to inform the network that the UE 102 is on a 911 call. The closest facsimile is the generic 486 code that merely indicates that the UE 102 is "busy." The call-handling (i.e., sending calls to voicemail) while the UE 102 is on a 911 call is, for example, generally handled by the UE 102. The network simply routes the call to the UE 102 as per normal.

To this end, examples of the present disclosure also include a new, updated SIP response code or SIP header that indicates the UE 102 is on a 911 call. Thus, in some examples, the SIP message can include the standard 486 "busy" code, but also include a header (e.g., "911") indicating the UE 102 is busy because the UE 102 is on a 911 call. In other examples, a separate, new, currently unused, SIP response code (e.g., 475) can be used to indicate that the UE 102 is on a 911 call.

When the UE 102 disconnects from the PSAP, the TAS can receive a second SIP message reenabling call-waiting to its normal operation (i.e., all calls can invoke call-waiting) and any other disabled functions. Of course, other components of the IMS 104 such as the Third-Generation Partnership Project (3GPP) Authentication, Authorization, and Accounting (AAA), home location register (HLR), or home subscriber serve (HSS), among others could also include this feature.

Obviously, the user can call both PSAPs 110a and "normal" callers 110b from the UE 102. It is only the calls to PSAPs 110a (e.g., calls to 911), however, that trigger the guard timer system 100. The first category 110a can be used to identify when the user is connected to a PSAP. Thus, the first category 110a can include, for example, the actual number dialed to reach e911 services (e.g., 911 in the U.S. and 999 in the UK) and actual local numbers for PSAPs. Thus, when the user dials any number in the first category 110a, the guard timer system 100 is activated. If a user then receives a call from a normal caller 110b, the system 100 can determine if the normal caller 110b was called within the guard timer 112 limit (either retroactively or proactively, as discussed below).

As the name implies, the guard timer 112 is literally a time limit and dictates whether a normal caller 110b is put through when the user is on a 911 call or handled in the usual manner. So, if the guard timer 112 is set to two minutes, for example, then at the moment the user dials 911, any call in the call history in the previous two minutes will be put through, other calls will no. Of course, two minutes is only an example and the guard timer 112 could be any length of time set by, for example, the user, the service provider or the manufacturer of the UE 102.

In some examples, the second category 110b can include a fixed list of callers. In other words, any call that was made in the two minutes prior to placing the 911 call is put through to the UE 102 for the duration of the 911 call. Any caller 110b who was not called in the last two minutes is handled in the usual manner. If the user made three calls in the two minutes prior to the 911 call, for example, then a call from a caller 110b associated with any of those three calls will be put through.

In other examples, the guard timer 112 can "expire" for each call based on its actual timestamp. In other words, a call placed immediately before the 911 call will be put through for the first two minutes of the 911 call, but a call placed one minute prior to the 911 call will only be put through for the first minute of the 911 call—at which point the two-minute guard timer 112 expires for that call. In this scenario, once the user has been on the 911 call for two minutes, the guard timer 112 will have expired for all calls and all calls with be handled in the usual manner.

In some cases, all calls received from callers in the first category 110a (PSAPs) can be put through to call-waiting irrespective of the guard timer 112. In this configuration, the guard timer 112 only applies to non-PSAP, or normal callers 110b. Thus, any caller that is in the first category 110a (a PSAP) and any caller in the second category 110b that is within the guard timer 112 window can be put through to call-waiting on the UE 102, while all other callers 110b are handled in the usual manner.

In a scenario where a user calls 911, hangs up, and then calls 911 again, for example, an operator may call the UE 102 back based on the first call (where the user hung-up). In this scenario, the operator can be put through to the user because the first call to 911 is within the guard timer 112 window and/or because the call is in the first category 110a. In this manner, the user may be able to hang up on the second 911 call—which may be on hold or in queue—and answer the incoming call from the PSAP operator. This enables the user to be connected to the PSAP 110a more quickly and clears a call from the queue at the PSAP 110a at the same time.

Of course, depending on the situation, the user may choose to (1) accept the incoming call and place the current (911) call on hold, (2) accept the incoming call and hang up the current (911) call, or (3) reject the incoming call. If a user dials 911 to report a missing child, for example, the user is not likely to accept a call from their cardiologist even if the user has called the cardiologist within the guard timer 112 window. A user who calls 911 to report a possible heart attack, on the other hand, may accept the call from the cardiologist and either place the 911 call on hold or disconnect from it. The user's cardiologist may insist that the user hang up and dial 911, for example. In this case, the user can simply switch back to the second 911 call already on hold. Regardless, the guard timer system 100 provides the user with the choice.

Thus, the first category 110a can include a list of local numbers for emergency providers (e.g., police, fire, emergency medical services (EMS), etc.) that are likely to call back in an emergency. In other words, when a caller dials 911, the PSAP 110a routes the call to the appropriate emergency service. When a PSAP 110a calls the user back, however, the PSAP 110a is generally calling from a local number. Thus, the caller ID, for example, for the call from the PSAP 110a is not "911," but some local phone number. Thus, the first category 110a can include all local numbers for PSAPs in, for example, the county, city, area, state, or region.

Figure 2:
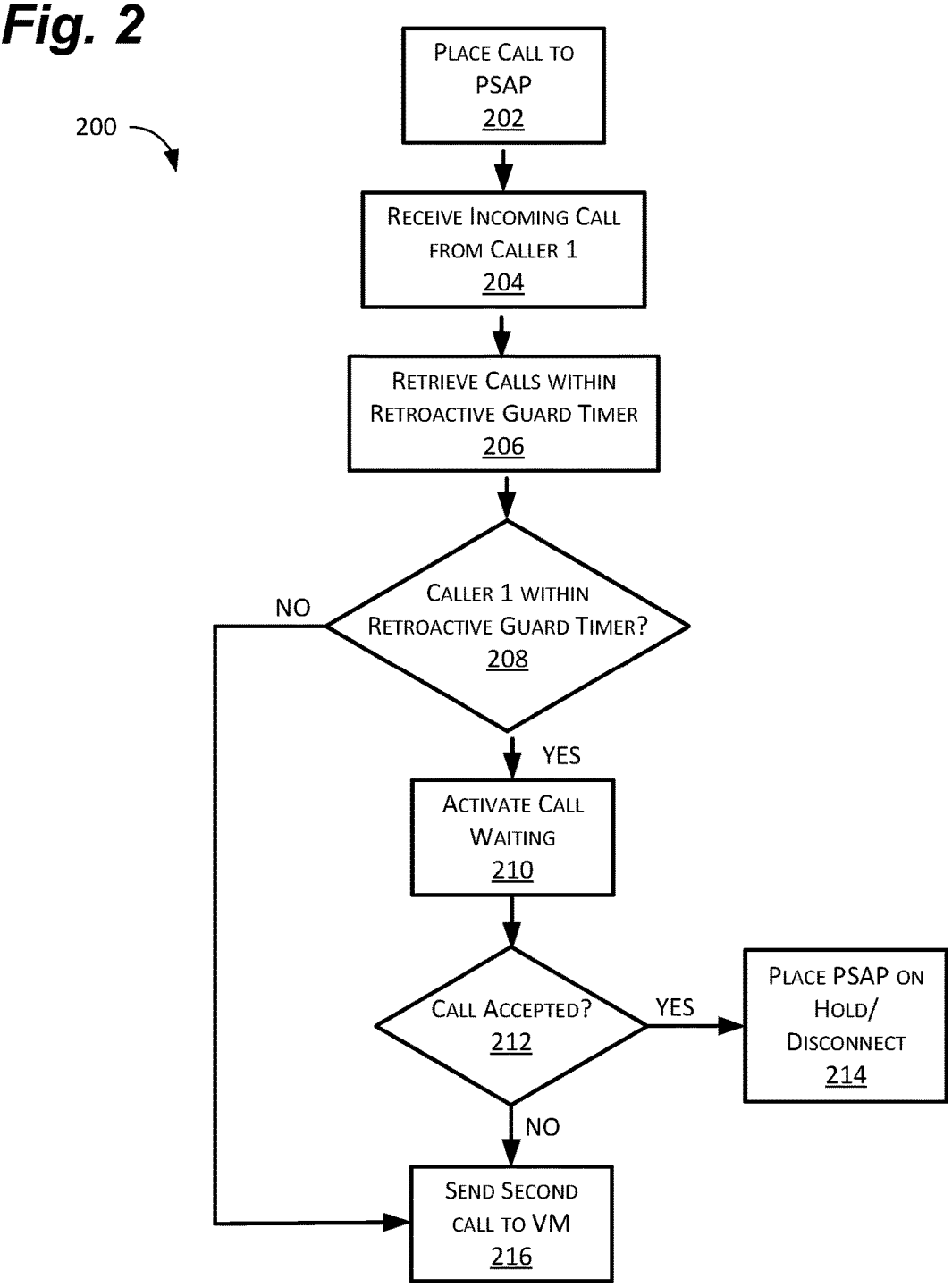
FIG. 2 is a flowchart depicting an example of a first method using a retroactive guard timer to optimize call handling during e911 calls, in accordance with some examples of the present disclosure.

As shown in FIG. 2, therefore, examples of the present disclosure can comprise a method 200 for providing a retroactive guard timer for optimized call handling during an e911 call. In its simplest form, the method 200 simply puts through any calls made in the last "X" minutes or seconds prior to the 911 call and handles all other calls in the usual manner. In this configuration, an application ("app"), the OS, or other software on the UE 102 can monitor calls and activate or deactivate call-waiting, as necessary. Thus, rather than simply sending a caller 110 to voicemail, for example, some callers 110 can be put through to call-waiting to enable the user to choose whether to take the call, or not.

At 202, the UE 102 can place a first call to a PSAP 110a. In the US, regardless of how the user places the call (e.g., cell phone, landline, tablet, etc.), this is generally achieved by dialing 911. In the UK, this is generally achieved by dialing 999. Other countries may use other codes or sequences. Regardless, as mentioned above, dialing 911, for example, currently activates special call handling, where all incoming calls are sent directly to voicemail. Thus, the UE 102 essentially enters "do not disturb" mode automatically.

In contrast, dialing 911 in this case can invoke the method 200 for providing optimized call handling during an e911 call, described herein. Thus, the user dialing 911 activates the app or script responsible for monitoring incoming calls and taking an appropriate action. The app can use a listening function, for example to detect when the dialer on the UE 102 dials 911. In other examples, the app can monitor the transceiver to detect when the UE 102 connects to a PSAP.

In some examples, the UE 102 can also include a list of local numbers associated with PSAPs (e.g., where 911 service is not available).

At 204, the UE 102 can receive a second call at the transceiver. Conventionally, with the UE 102 connected to the PSAP 110a, the UE 102 (or the network) would simply handle the second call in the usual manner. In this case, however, the method 200 can determine if the incoming call is a caller that was dialed within a predetermined amount of time prior to the 911 call—or within the retroactive guard time. A caller that the user has not dialed within the predetermined amount of time can still be handled in the usual manner. Recent calls, on the other hand, can activate call-waiting to give the user the option to take the call. In this manner, the user is not distracted by random calls, for example, during an emergency, but may receive calls from callers that the user was recently attempting to contact.

To this end, at 206, the method 200 can retrieve the call history for calls within the retroactive guard timer (e.g., within the last two minutes). In some examples, this can be achieved by consulting the built-in call history log found in most UEs 102. In other examples, a running call list can be stored in an app for use in this scenario. In still other examples, the app may simply look at the timestamps of the calls in the call history log of the UE 102 and select the appropriate calls.

At 208, the app can determine if the second call is from a caller that was called prior to the 911 call and within the retroactive guard timer. Thus, callers that the UE 102 dialed outside the retroactive guard timer and callers that simply have never been dialed from the UE 102 are handled in the usual manner, while calls from callers within the retroactive guard timer are sent through to the UE 102. If the retroactive guard timer is set to five minutes, for example, a number dialed on the UE 102 four minutes before the 911 call would be put through to call-waiting, while a call made six minutes before the 911 call would be sent straight to voicemail.

At 210, if the second call is a caller that was called recently enough—i.e., within the retroactive guard timer—the app can activate call-waiting. As normal, the call-waiting can include the name and/or number of the caller to enable the user to decide whether to reject or accept the call.

In some cases, the call from Caller 1 may be coming from a PSAP 110a calling from an unknown local number. In other words, if the user dialed 911, hung up, and then dialed 911 again, then Caller 1 may be the PSAP 110a calling back due to the first call to 911. Because the PSAP 110a is likely calling from a local number, however, the call-waiting will not necessarily say "911," but rather will display the local number (e.g., 404-555-1212). To this end, in some examples, all incoming PSAP calls can include a code or message (e.g., a SIP message) that causes the UE 102 to display "911," "PSAP," "Emergency Services," or some other indication of who is calling. This gives the user some indication of who is calling, though the user may not recognize the number.

At 212, the method 200 (e.g., an app) can determine if the user accepted the call or rejected the call (or simply let it go to voicemail). At 214, if the user chose to accept the incoming call, then the normal call-waiting functions can be available to the user. In other words, the user can choose to reject the second call, take the second call and place the first call on hold, or take the second call and hang up the first call, among other things. If the user is a family member, the user may wish to switch over, leaving the 911 call on hold, quickly tell the family member what is going on, and the switch immediately back to the 911 call—hopefully in an effort not to miss the PSAP operator.

At 216, if the caller 110b was not called by the UE 102 within the retroactive guard timer or the user rejects the second call or lets it go to voicemail, the caller 110b can be sent to voicemail to enable the caller to leave a message. Thus, ultimately, the caller ends up in voicemail; however, the user has at least been provided with the opportunity to answer calls from those callers who were dialed recently from the UE 102. In either case, the caller can leave a message as normal.

Figure 3:
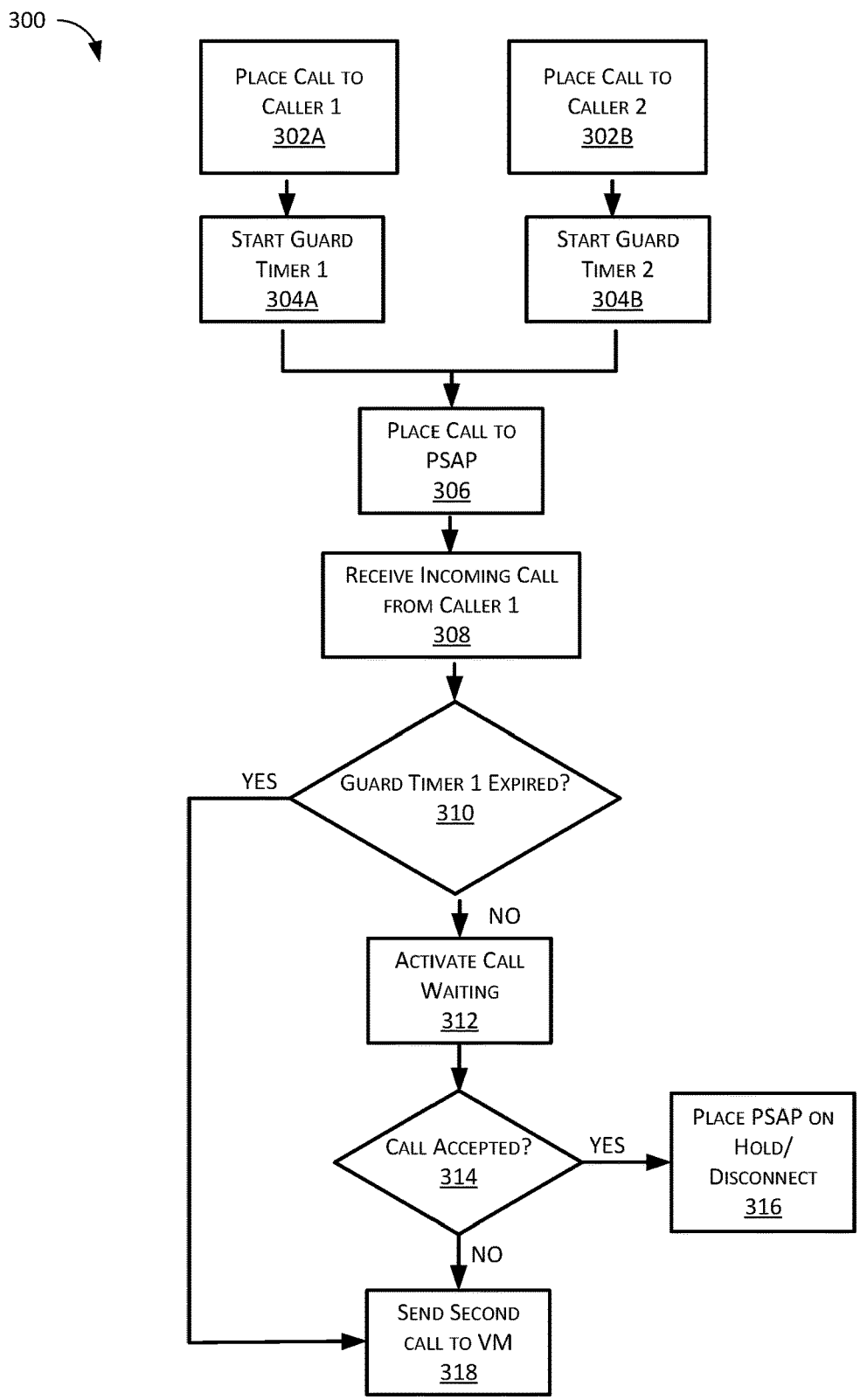
FIG. 3 is a flowchart depicting an example of a method for using multiple proactive guard timers to optimize call handling during e911 calls, in accordance with some examples of the present disclosure.

As shown in FIG. 3, examples of the present disclosure can comprise a method 300 for providing multiple caller-specific guard timers for optimized call handling during an e911 call. As mentioned above, a somewhat more complicated approach is to maintain a separate guard timer for each call made from the UE 102. In other words, rather than just including "all calls made in the last 5 minutes prior to the 911 call," for example, the system can put through all calls made in the last five minutes from the present time based on a specific guard timer for each separate call made prior to dialing 911. In this manner, for a five-minute guard timer, for example, the caller-specific guard timer for a call made one minute prior to the 911 call, for example, will expire four minutes into the 911 call. The caller-specific guard timer for a call made three minutes prior to the 911 call, on the other hand, will expire two minutes into the 911 call. Of course, five minutes is used merely as an example, and other predetermined time windows could be used.

To this end, at 302, the user can place a call to Caller 1 at a first time (302A) and a call to Caller 2 at a second time (302B). At 304, a caller-specific guard timer for each call can be set. In this case, at 304A, caller-specific guard timer 1 can be set for call 1. Similarly, at 304B, caller-specific guard timer 2 can be set for call 2. As above, this can be done by checking the call history of the UE 102 in response to the user calling 911, for example, or can simply be a running list of recent calls that are within the predetermined call window. In other words, the app can maintain a running list of all calls made in the last five minute, which changes over time as calls drop off and new calls are made. In its simplest form, however, the app can simply refer to the "recent calls" list maintained on most UEs 102.

At 306, the user can place a call to the PSAP 110a. As mentioned above, this may be achieved by dialing 911, for example, or dialing the appropriate local number or code for PSAPs 110a in the user's area. At 308, the UE 012 can receive an incoming call from Caller 1. Normally, the IMS 104 would simply route the call to the UE 102 and, if the UE 102 were on an emergency call, the UE 102 would automatically send the call to voicemail. In this case, however, how the call is handled depends on whether the caller-specific guard timer for that particular number has expired or not.

At 310, the method 300 can determine if the caller-specific guard timer for that call has expired or not. In this case, because the incoming call is from Caller 1, this involves determining if caller-specific guard timer 1 has expired. Of course, if the call is from anyone other than Caller 1 or Caller 2 (and perhaps a PSAP 110a, as discussed above), then the call is automatically handled in the usual manner because the call would not have a guard timer set. In this case, while caller-specific guard timer 1 and caller-specific guard timer 2 were both set to five minutes, they were started at different times (e.g., call 1 was placed before call 2) and thus, expire at different times. If call 1 and call 2 were placed one minute apart, for example, then caller-specific guard timer 1 would expire one minute before caller-specific guard timer 2.

At 312, if caller-specific guard timer 1 has not expired, the method 300 can send the call through to the UE 102, activating call-waiting. Thus, the user is given the opportunity to accept or reject the call—even though they are on an emergency call.

At 314, the method 300 can determine if the user accepted the call or not. All things being equal, it is probably more likely that the user would not accept the call while on an emergency call, when compared to a regular call. Calls placed immediately prior to the 911 call (e.g., to the caller's doctor), however, may prompt the user to answer the call and place the PSAP 110a on hold or hang up with the PSAP 110a. Thus, the caller is given the option to reject random calls that just happened to be placed within the caller-specific guard timer, for example; yet, accept calls that are relevant to the pending emergency or that the user otherwise wishes to answer.

To this end, at 316, the user can have the normal choices to place the emergency call on hold or to hang up. The user may wish to switch over to Caller 1 briefly, for example, to give a loved one an update and then switch back to the emergency call. In some examples, Caller 1 may be better equipped to help the user than the PSAP operator. In this case, the user can simply hang up the emergency call and take the incoming call.

At 318, if, on the other hand the (1) user (or rather, the UE 102) has never called the number or (2) the caller-specific guard timer for that number has expired, or (3) the user rejects the call, the caller 110 can be sent to voicemail to enable the caller 110 to leave a message. Thus, even for calls with unexpired guard timers, the user has the choice to answer the call or remain on the emergency call depending on circumstances. If the user is on hold with the PSAP or in queue, for example, the user may choose to answer the call. If the user is actively speaking with a PSAP operator, on the other hand, the user may choose to let the caller 110 go to voicemail. In the case of a caller for which no caller-specific guard timer is set (i.e., the user has not called the caller in the last 5 minutes or has never called the caller), however, the call is handled in the usual manner.

Figure 4:
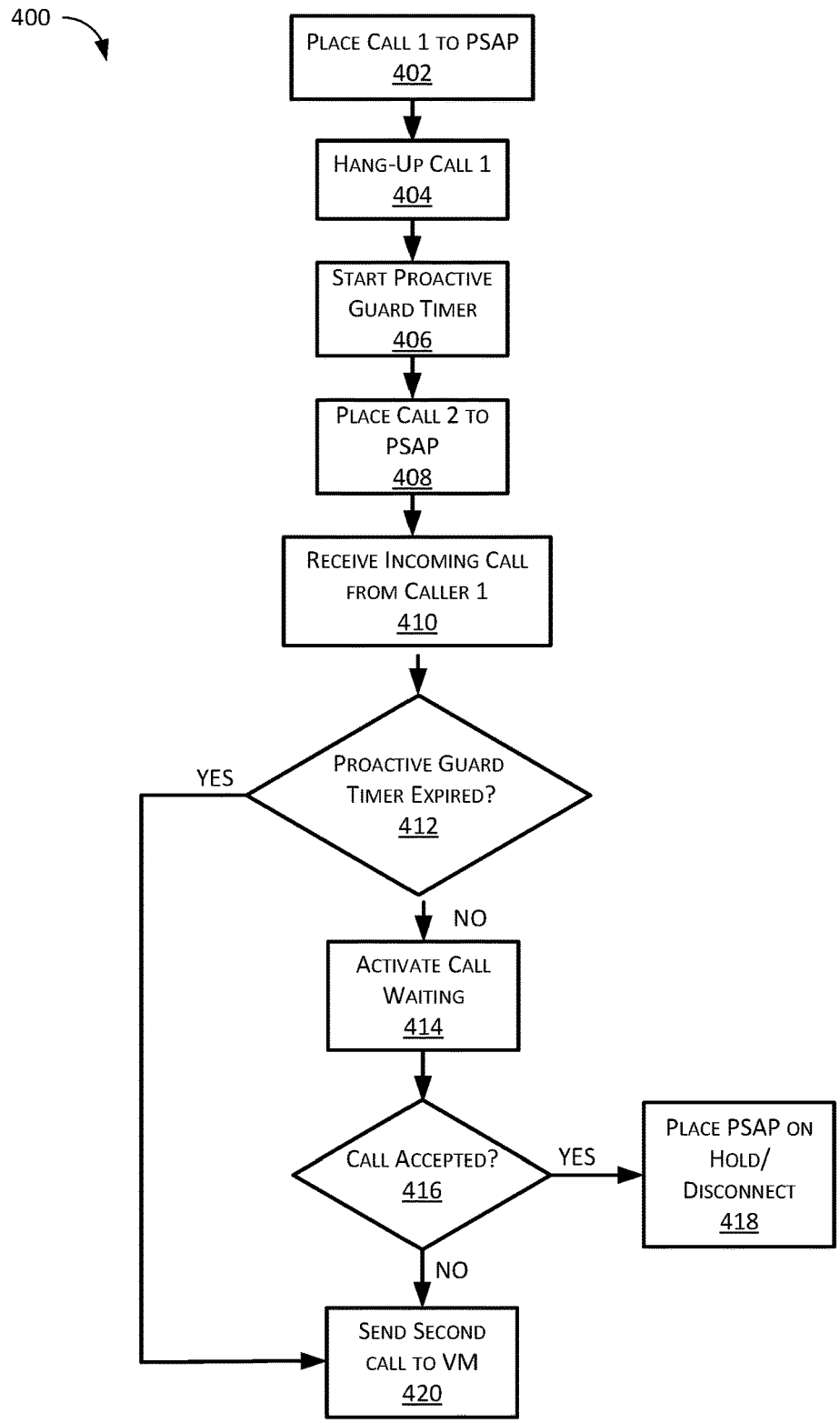
FIG. 4 is a flowchart depicting an example of a method using caller-specific guard timers to optimize call handling during e911 calls, in accordance with some examples of the present disclosure.

As shown in FIG. 4, therefore, examples of the present disclosure can comprise a method 400 for providing a proactive guard timer that is not caller specific. In his configuration, a proactive guard timer can be set at the conclusion of an initial 911 call. If the user then calls 911 again, all calls (as opposed to calls from a specific caller) that come into the UE 102 within the proactive guard timer are sent to the UE 102 (e.g., to call-waiting). Once the proactive guard timer expires, if the user is still on the 911 call, all calls are handled in the usual manner. At least one benefit to this method 400 is that it is likely that the incoming call is from the PSAP 110a in response to the initial 911 call from which the user hung up.

To this end, at 402, the user (or rather, the UE 102) can place Call 1 to the PSAP 110a. At 404, the user can hang up on Call 1. This may be because the PSAP placed the call on hold, didn't answer, or placed the user in a long queue, among other things.

Regardless, at 406, the method 400 can set the proactive guard timer. The proactive guard timer can be for any suitable time, which can be chosen by the user, the app provider, the service provider, or manufacturer, among other things. The proactive guard timer basically says, "If the user calls 911 again, any caller that calls prior to the proactive guard timer will be put through to the UE 102. Any incoming calls after the proactive guard timer has expired are handled in the usual manner." To this end, at 408, the user can place Call 2 to the PSAP 110a (though not necessarily the same PSAP 110a).

At 410, the user can receive a call from Caller 1. In this case, however, the identity of Caller 1 is irrelevant. In other words, it does not matter if the user has called Caller 1 recently, or at all, just that the proactive guard timer has not expired. Thus, at 412, the method 400 can determine if the proactive guard timer has expired. Again, this step has nothing to do with who is calling, just when they are calling. Beneficially, Caller 1 is likely the PSAP 110a calling back from Call 1. Of course, it is also possible that a telemarketer would just happen to call at this particular time, though this is a relatively slim possibility.

At 414, if the proactive guard timer has not expired, the method 400 can send the call through to the UE 102, activating call-waiting. Thus, the user is given the opportunity to accept or reject the call—even though they are on an emergency call.

At 416, the method 400 can determine if the user accepted the call or not. All things being equal, it is probably more likely that the user would not accept the call while on an emergency call, when compared to a regular call. In this case, however, it is fairly likely that Caller 1 is the PSAP 110a calling back from Call 1. Thus, the caller is given the option to reject random calls that just happened to be received within the proactive guard timer, for example; yet, accept calls that are relevant to the pending emergency or that the user otherwise wishes to answer.

To this end, at 418, the user can have the normal choices to place the emergency call on hold or to hang up. In this case, because Caller 1 is likely the PSAP 110a the user was trying to contact in the first place, the user may wish to accept the incoming call and hang up Call 2. As mentioned above, this can expedite the process for both the user and the PSAP 110a. Of course, the user may also have called a loved one, doctor, etc. just prior to Call 1. Thus, the user may wish to switch over to Caller 1 briefly, for example, to give a loved one an update and then switch back to the emergency call. In some examples, Caller 1 may be better equipped to help the user than the PSAP operator. In this case, the user can simply hang up the emergency call and take the incoming call.

At 420, once the proactive guard timer expires, all incoming calls can be handled in the usual manner. In addition, if the user rejects Caller 1, Caller 1 can be sent to voicemail to enable Caller 1 to leave a message. Thus, even prior to the proactive guard timer expiring, the user maintains the choice to answer the call or remain on the emergency call depending on circumstances. If the user is on hold with the PSAP or in queue, for example, the user may choose to answer the call regardless of who it is. If the user is actively speaking with a PSAP operator, on the other hand, the user may choose to let the caller 110 go to voicemail regardless of who it is.

These methods 200, 300, 400 could be performed by an app on the UE 102 or the OS of the UE 102, as described above. The methods 200, 300, 400 could just as easily be carried out by a component of the IMS 104, however. An TAS, for example, could monitor calls to and from the UE 102, maintain the retroactive guard timer(s), and route calls appropriately. Similarly, an MSC, 3GPP AAA server, or other network entity could handle some, or all, of the methods 200, 300, 400. To this end, the methods 200, 300, 400 discussed above are purely illustrative and not intended to limit the disclosure.

Figure 5:
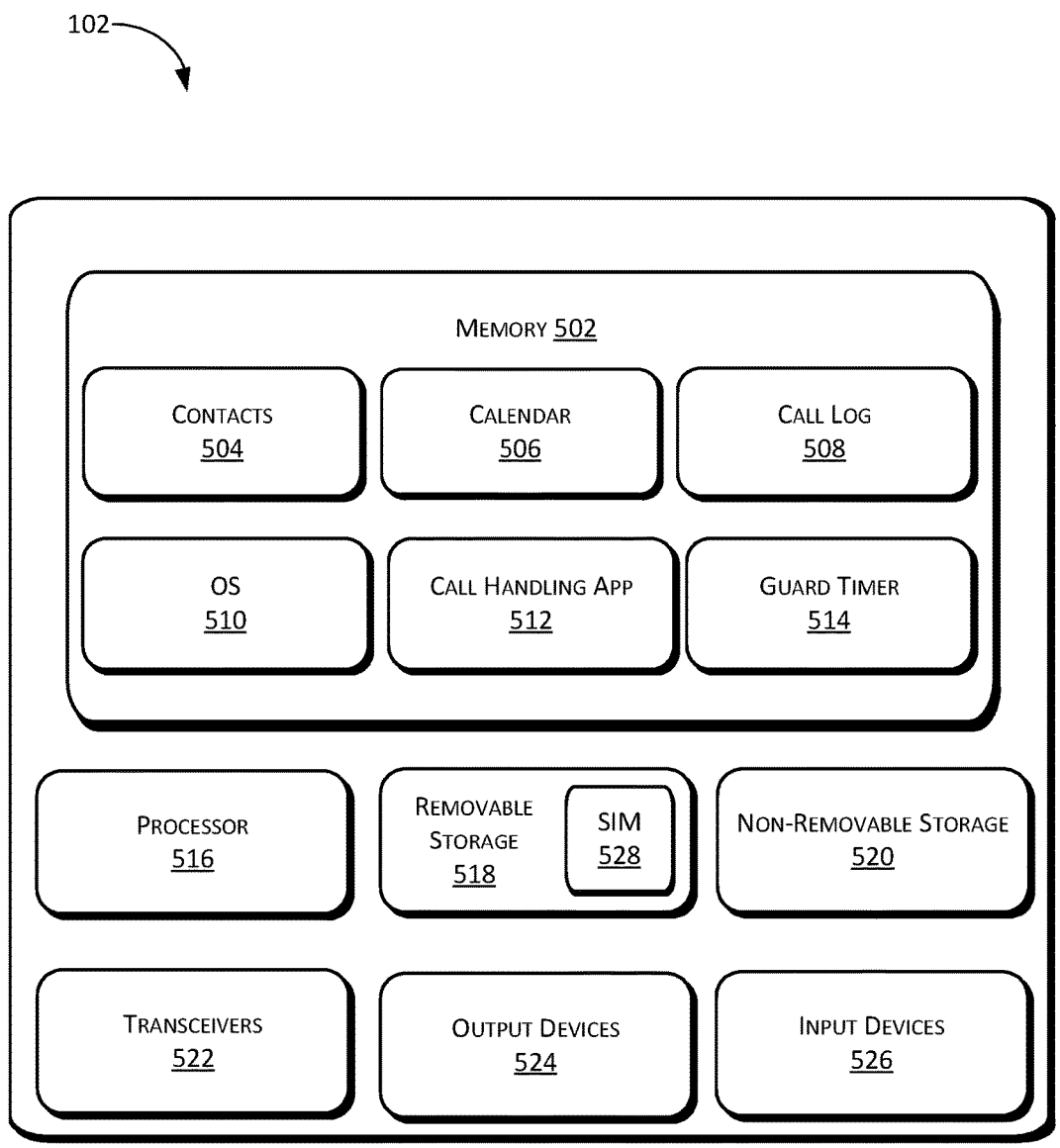
FIG. 5 is an example of a UE for use with the systems and methods disclosed herein, in accordance with some examples of the present disclosure.

As shown in FIG. 5, some or all of the system 100 and methods 200, 300, 400 can be performed by, and/or used in conjunction with, a UE 102 that can comprise a variety of electronic devices. For clarity, the UE 102 is described herein generally as a cell phone or smart phone. One of skill in the art will recognize, however, that the system 100 and methods 200, 300, 400 can also be used with a variety of other electronic devices, such as, for example, tablet computers, laptops, desktops, and other network (e.g., cellular or IP network) connected devices from which a 911 call can be placed. These devices are referred to collectively herein as UEs 102.

The UEs 102 can comprise a number of components to execute the above-mentioned functions and apps. As discussed below, the UEs 102 can comprise memory 502 including many common features such as, for example, the contacts 504, calendar 506, the aforementioned call log (or, call history) 508, and the operating system (OS) 510. In this case, the memory 502 can also store a call-handling app 512 and the guard timer 514.

The UEs 102 can also comprise one or more processors 516. In some implementations, the processor(s) 516 is a central processing unit (CPU), a graphics processing unit (GPU), or both CPU and GPU, or any other sort of processing unit. The UEs 102 can also include one or more of removable storage 518, non-removable storage 520, transceiver(s) 522, output device(s) 524, and input device(s) 526. In some examples, such as for cellular communication devices, the UEs 102 can also include a subscriber identification module (SIM) 528 including an International Mobile Subscriber Identity (IMSI), and other relevant information.

In various implementations, the memory 502 can be volatile (such as random access memory (RAM)), non-volatile (such as read only memory (ROM), flash memory, etc.), or some combination of the two. The memory 502 can include all, or part, of the functions 504, 506, 508, 512, 514 and the OS 510 for the UEs 102, among other things.

The memory 502 can also comprise contacts 504, which can include names, numbers, addresses, and other information about the user's business and personal acquaintances, among other things. In some examples, the memory 502 can also include a calendar 506, or other software, to enable the user to track appointments and calls, schedule meetings, and provide similar functions. In some examples, the memory 502 can also comprise the call log 508 of calls received, missed, and placed from the UE 102. As usual, the call log 508 can include timestamps for each call for use by the system 100. Of course, the memory 502 can also include other software such as, for example, e-mail, text messaging, social media, and utilities (e.g., calculators, clocks, compasses, etc.).

The memory 502 can also include the OS 510. Of course, the OS 510 varies depending on the manufacturer of the UE 102 and currently comprises, for example, iOS 10.3.2 for Apple products and Nougat for Android products. The OS 510 contains the modules and software that supports a computer's basic functions, such as scheduling tasks, executing applications, and controlling peripherals.

As mentioned above, the UE can also include a call-handling module, or call-handling app 512. The call-handling app 512 can perform some or all of the functions discussed above with respect to the methods 200, 300, 400, 400 for call handling on the UE 102. Thus, the call-handling app 512 can also have access to the call log 508 and guard timer 514. Thus, the call-handling app 512 can be activated when the user dials 911, for example, or can have a listening function that monitors the transceiver(s) 522, for example, and activates when 911 is dialed (or a local PSAP 110a number is dialed, if applicable).

Thus, the call-handling app 512 can determine that the UE 102 has dialed 911, for example, and then await incoming calls. If an incoming call comes in during the 911 call, the call-handling app 512 can consult the (retroactive) guard timer 514 to determine the predetermined time window (e.g., five minutes) and then consult the call log 508 for calls made within that window. Using this information, the call-handling app 512 can determine if the incoming call should be sent to voicemail or the user. If the incoming call was placed to the caller within the predetermined time window prior to the user dialing 911, for example, the call-handling app 512 can activate call-waiting to enable the user to accept, reject, or simply ignore the incoming call. Similarly, in some examples, the call-handling app 512 can determine if the proactive guard timer 514 has expired and route calls accordingly.

The UEs 102 may also include additional data storage devices (removable and/or non-removable) such as, for example, magnetic disks, optical disks, or tape. Such additional storage is illustrated in FIG. 5 by removable storage 518 and non-removable storage 520. The removable storage 518 and non-removable storage 520 can store some, or all, of the functions 504, 506, 508, 510.

Non-transitory computer-readable media may include volatile and nonvolatile, removable and non-removable tangible, physical media implemented in technology for storage of information, such as computer readable instructions, data structures, program modules, or other data. The memory 502, removable storage 518, and non-removable storage 520 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UEs 102. Any such non-transitory computer-readable media may be part of the UEs 102 or may be a separate database, databank, remote server, or cloud-based server.

In some implementations, the transceiver(s) 522 include any sort of transceivers known in the art. In some examples, the transceiver(s) 522 can include wireless modem(s) to facilitate wireless connectivity with the other UEs, the Internet, and/or an intranet via a cellular connection. Further, the transceiver(s) 522 may include a radio transceiver that performs the function of transmitting and receiving radio frequency communications via an antenna (e.g., Wi-Fi or Bluetooth®). In other examples, the transceiver(s) 522 may include wired communication components, such as a wired modem or Ethernet port, for communicating with the other UEs or the provider's Internet-based network.

In some implementations, the output device(s) 524 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UEs 102 is connected to a network, the type of call being received (e.g., video calls vs. voice calls), the number of active calls, etc. Output device(s) 524 also include ports for one or more peripheral devices, such as headphones, peripheral speakers, or a peripheral display.

In various implementations, input device(s) 526 include any sort of input devices known in the art. For example, the input device(s) 526 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 6:
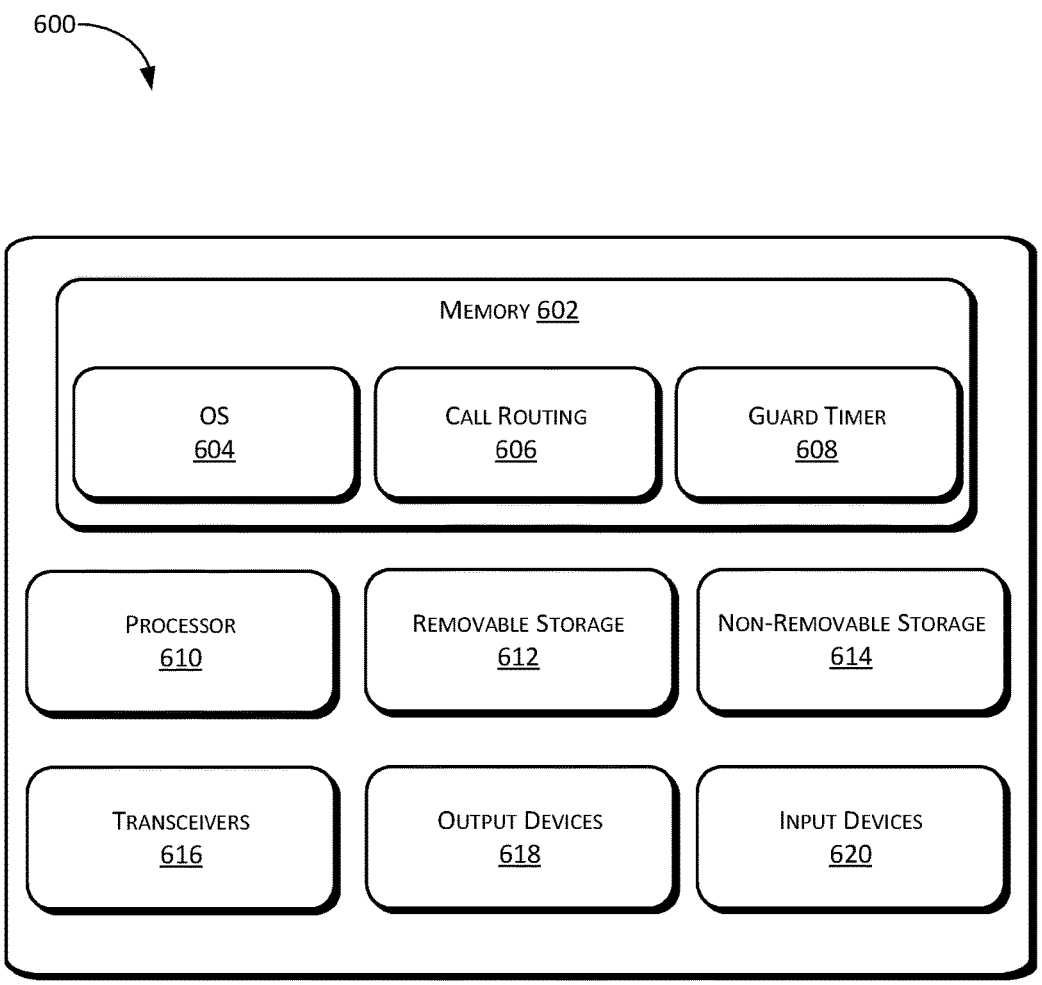
FIG. 6 is an example of a network server for use with the systems and methods disclosed herein, in accordance with some examples of the present disclosure.

As shown in FIG. 6, the system 100 and methods 200, 300, 400 can also be used in conjunction with a network entity, or server 600, of the IMS 104, which can comprise a variety of electronic devices. As mentioned above, this server 600 can comprise a TAS, 3GPP AAA server, HLR, HSS, or another server or component associated with the IMS 104.

The server 600 can comprise a number of components to execute the above-mentioned functions and apps. As discussed below, the server 600 can comprise memory 602 including many common features such as, for example, the OS 604, call routing module 606, and the guard timer 608.

The server 600 can also comprise one or more processors 610. In some implementations, the processor(s) 610 can be a central processing unit (CPU), a graphics processing unit (GPU), or both CPU and GPU, or any other sort of processing unit. The server 600 can also include one or more of removable storage 612, non-removable storage 614, transceiver(s) 616, output device(s) 618, and input device(s) 620.

In various implementations, the memory 602 can be volatile (such as random access memory (RAM)), non-volatile (such as read only memory (ROM), flash memory, etc.), or some combination of the two. The memory 602 can include all, or part, of the functions 606, 608 for the server 600, among other things. The memory 602 can also include the OS 604. Of course, the OS 604 varies depending on the manufacturer of the server 600 and the type of component. Many servers, for example, run Linux or Windows Server. Dedicated cellular routing servers may run specific telecommunications OS 604. The OS 604 contains the modules and software that supports a computer's basic functions, such as scheduling tasks, executing applications, and controlling peripherals.

In some examples, depending in the server's function, the server 600 can also comprise a call routing module 606. The server 600 can comprise an MSC 618 (discussed below), for example, responsible for routing voice calls from one UE 102 to another or to a landline. Regardless, the server 600 can route calls through the IMS 104 to their destination. In some examples, the call routing module 606 can also work in concert with the white list 608 to affect proper call handling when a user is on an emergency call—routing recent calls to the UE 102 and other calls to voicemail.

In some examples, the server 600 can also comprise the guard timer 608. As mentioned above, the optimized call handling during e911 calls can be handled on the UE 102 or on the IMS 104 (i.e., the network side). In the case of network implementation, the server 600 can determine whether the user is on a 911 call. If, during the 911 call, the user receives a second call, the server 600 can consult the guard timer 608 and a call log associated with the user's UE 102 to determine whether a caller was called within the predetermined time period (retroactive guard timer) or whether the guard timer has expired (proactive guard timer).

If the caller was called on the UE 102 prior to the 911 call and within the predetermined time window, for example, then the caller can be sent through to the UE 102 to activate call-waiting, as discussed above.

The server 600 may also include additional data storage devices (removable and/or non-removable) such as, for example, magnetic disks, optical disks, or tape. Such additional storage is illustrated in FIG. 6 by removable storage 612 and non-removable storage 614. The removable storage 612 and non-removable storage 614 can store some, or all, of the OS 604 and functions 606, 608.

Non-transitory computer-readable media may include volatile and nonvolatile, removable and non-removable tangible, physical media implemented in technology for storage of information, such as computer readable instructions, data structures, program modules, or other data. The memory 602, removable storage 612, and non-removable storage 614 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the server 600. Any such non-transitory computer-readable media may be part of the server 600 or may be a separate database, databank, remote server, or cloud-based server.

In some implementations, the transceiver(s) 616 include any sort of transceivers known in the art. In some examples, the transceiver(s) 616 can include wireless modem(s) to facilitate wireless connectivity with the other UEs, the Internet, and/or an intranet via a cellular connection. Further, the transceiver(s) 616 may include a radio transceiver that performs the function of transmitting and receiving radio frequency communications via an antenna (e.g., Wi-Fi or Bluetooth®). In other examples, the transceiver(s) 616 may include wired communication components, such as a wired modem or Ethernet port, for communicating with the other UEs or the provider's Internet-based network.

In some implementations, the output device(s) 618 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the server 600 is connected to a network, the type of call being received (e.g., video calls vs. voice calls), the number of active calls, etc. Output device(s) 618 also include ports for one or more peripheral devices, such as headphones, peripheral speakers, or a peripheral display.

In various implementations, input device(s) 620 include any sort of input devices known in the art. For example, the input device(s) 620 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 7:
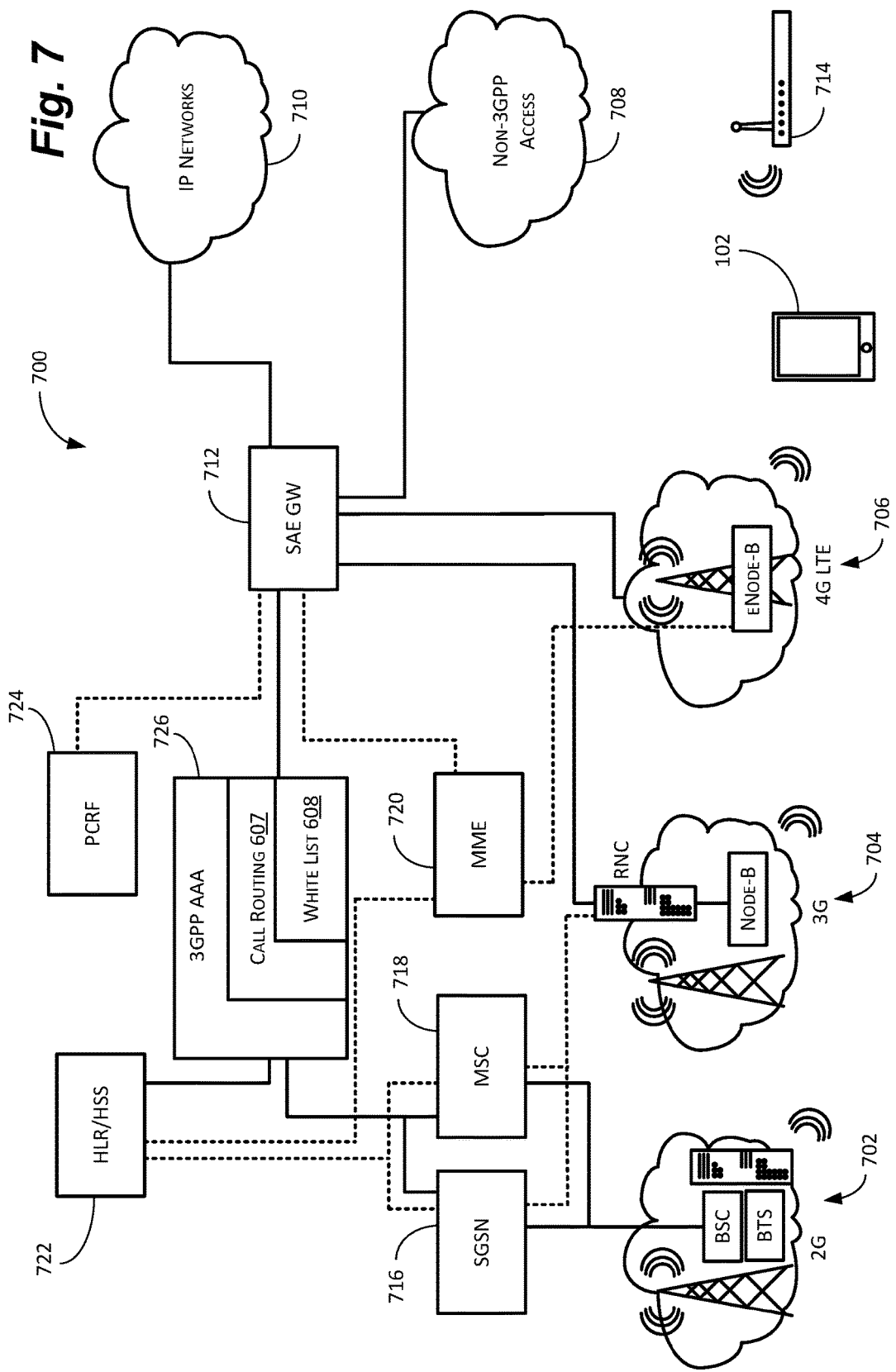
FIG. 7 is an example of a cellular and internet protocol network for use with the systems and methods disclosed herein, in accordance with some examples of the present disclosure.

FIG. 7 depicts a conventional cellular network 700 including 2G 702, 3G 704, and 4G long-term evolution (LTE) 706 components. Of course, future technologies, such as, for example, 7G and device-to-device (D2D) components could also be included and are contemplated herein. As mentioned above, many of the "back-end" components of the network 700 could handle some, or all, of the system 100 and methods 200, 300, 400 associated with optimized call handling during e911 calls. Indeed, some, or all, of the aforementioned call routing module 507 and white list 508 components could be located on one or more of, for example, the HLR/HSS 722, the 3GPP AAA server 726, or other components.

As is known in the art, data can be routed from the Internet or other sources using a circuit switched modem connection (or non-3GPP connection) 708, which provides relatively low data rates, or via IP based packet switched 710 connections, which results is higher bandwidth. The LTE system 706, which is purely IP based, essentially "flattens" the architecture, with data going straight from the internet to the service architecture evolution gateway (SAE GW) 712 to evolved Node B transceivers 706, enabling higher throughput. Many UEs 102 also have wireless local area network (WLAN) 714 capabilities, in some cases enabling even higher throughput. In some cases, cellular carriers may use WLAN communications in addition to, or instead of, cellular communications to supplement bandwidth.

The serving GPRS support node (SGSN) 716 is a main component of the general packet radio service (GPRS) network, which handles all packet switched data within the network 700—e.g. the mobility management and authentication of the users. The MSC 718 essentially performs the same functions as the SGSN 716 for voice traffic. The MSC 718 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 718 sets up and releases the end-to-end connection, handles mobility and hand-over requirements during the call, and takes care of charging and real time pre-paid account monitoring.

Similarly, the mobility management entity (MME) 720 is the key control-node for the 4G LTE network 706. It is responsible for idle mode UE 102 paging and tagging procedures including retransmissions. The MME 720 is involved in the bearer activation/deactivation process and is also responsible for choosing the SAE GW 712 for the UE 102 at the initial attach and at time of intra-LTE handover involving Core Network (CN) node relocation (i.e., switching from one cell tower to the next when traveling). The MME 720 is responsible for authenticating the user (by interacting with the HSS 722 discussed below). The Non-Access Stratum (NAS) signaling terminates at the MME 720 and it is also responsible for generation and allocation of temporary identities to UE 102. The MME 720 also checks the authorization of the UE 102 to camp on the service provider's HPLMN or VPLMN and enforces UE 102 roaming restrictions on the VPLMN. The MME 720 is the termination point in the network for ciphering/integrity protection for NAS signaling and handles the security key management. The MME 720 also provides the control plane function for mobility between LTE 706 and 2G 702/3G 704 access networks with the S3 interface terminating at the MME 720 from the SGSN 716. The MME 720 also terminates the S7a interface towards the home HSS 722 for roaming UEs 102.

The HSS/HLR 722 is a central database that contains user-related and subscription-related information. The functions of the HSS/HLR 722 include functionalities such as mobility management, call and session establishment support, user authentication and access authorization. The HSS, which is used for LTE connections, is based on the previous HLR and Authentication Center (AuC) from CGMA and GSM technologies, with each serving substantially the same functions for their respective networks.

The policy and charging rules unction (PCRF) 724 is a software node that determines policy rules in the network 700. The PCRF 724 is generally operates at the network core and accesses subscriber databases (e.g., the HSS/HLR 722) and other specialized functions, such as enhanced e911 call handling, in a centralized manner. The PCRF 724 is the main part of the network 700 that aggregates information to and from the network 700 and other sources (e.g., IP networks 710). The PCRF 724 can support the creation of rules and then can automatically make policy decisions for each subscriber active on the network 700. The PCRF 724 can also be integrated with different platforms like billing, rating, charging, and subscriber database or can also be deployed as a standalone entity.

Finally, the 3GPP AAA server 726 performs authentication, authorization, and accounting (AAA) functions and may also act as an AAA proxy server. For WLAN 714 access to (3GPP) IP networks 710 the 3GPP AAA Server 726 provides authorization, policy enforcement, and routing information to various WLAN components. The 3GPP AAA Server 726 can generate and report charging/accounting information, performs offline charging control for the WLAN 714, and perform various protocol conversions when necessary.

As shown, in some examples, the 3GPP AAA server 726 can contain some, or all, of the components of the guard timer for enhanced e911 call handling. The 3GPP AAA server 726 can contain, for example, the call routing module 507 and the white list 508, among other things. Of course, as mentioned above, other components (e.g., the HSS/HLR 722) could also include some, or all, of the guard timer for enhanced e911 call handling.

Figure 8:
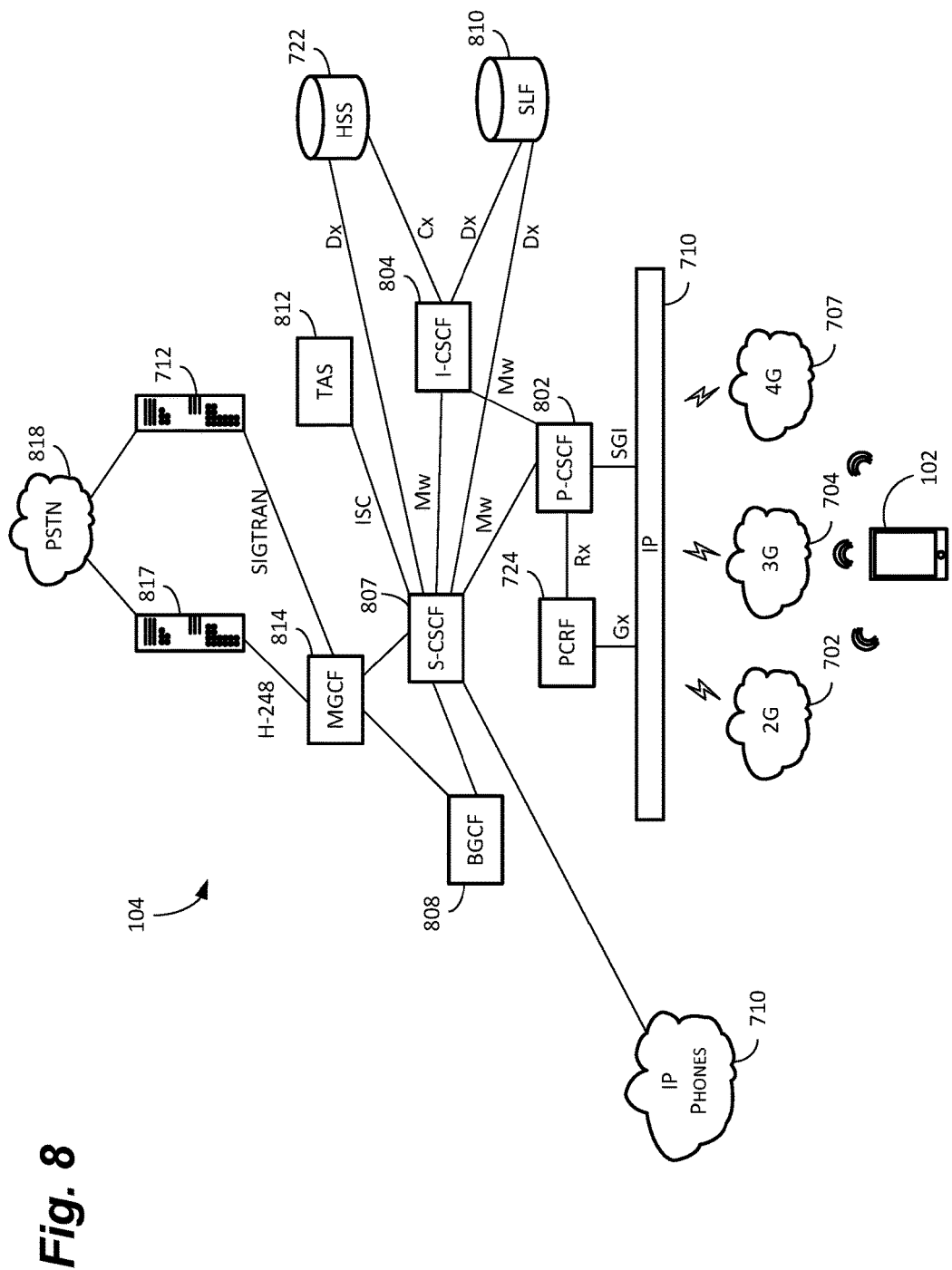
FIG. 8 is an example of an Internet Protocol Multimedia Core Network Subsystem ("IMS") for use with the systems and methods disclosed herein, in accordance with some examples of the present disclosure.

FIG. 8 includes a more detailed view of the IMS 104. As shown, the IMS 104 includes a number of network components for routing signals, storing subscriber information, and connecting across various subsystems and network types. As discussed above, the IMS 104 is built on SIP as the base to further support packaging of voice, video, data, fixed, and mobile services on a single platform to end users. It enables communications across multiple types of networks, including cellular, satellite, broadband, cable, and fixed networks, and enables the creation of efficient interoperating networks.

As mentioned above, the IMS 104 provides interoperability for UEs 102 and other devices across multiple platforms including, for example, 2G 702, 3G 704, 4G 706, IP 710 networks. The IMS 104 also includes some components already discussed in the more general FIG. 7. These include, for example, the PCRF 724, HSS 722 and SAE GW 712.

The IMS 104 also includes, however, a proxy-call session control function (P-CSCF) 802. The P-CSCF 802 is the entry point to the IMS 104 and serves as the outbound proxy server for the UE 102. The UE 102 attaches to the P-CSCF 802 prior to performing IMS registrations and initiating SIP sessions. The P-CSCF 802 may be in the home domain of the IMS operator, or it may be in the visiting domain, where the UE 102 is currently roaming. For attachment to a given P-CSCF 802, the UE performs P-CSCF 802 discovery procedures. Attachment to the P-CSCF 802 enables the UE 102 to initiate registrations and sessions with the IMS 104.

The IMS 104 also includes an interrogating-call session control function (I-CSCF) 804. The I-CSCF 804 acts as an inbound SIP proxy server in the IMS 104. During IMS registrations, the I-CSCF 804 queries the HSS 722 to select the appropriate S-CSCF 806 (discussed below) which can serve the UE 102. During IMS 104 sessions, the I-CSCF 804 acts as the entry point to terminating session requests. The I-CSCF 804 routes the incoming session requests to the S-CSCF 806 of the called party.

The IMS 104 also includes a serving-call session control function (S-CSCF) 806. The S-CSCF 806 acts as a registrar server, and in some cases as a redirect server. The S-CSCF 806 facilitates the routing path for mobile originated or mobile terminated session requests. The S-CSCF 806 also interacts with various components for playing tones and announcements, among other things.

The IMS 104 also includes a breakout gateway control function (BGCF) 808. The BGCF 808 is the IMS 104 element that selects the network in which PSTN 818 (discussed below) breakout is to occur. If the breakout is to occur in the same network as the BGCF 808, for example, then the BGCF 808 selects a Media Gateway Control Function (MGCF) 814 (also discussed below) that will be responsible for interworking with the PSTN 818. The MGCF 814 then receives the SIP signaling from the BGCF 808.

The IMS 104 also includes a subscriber location function (SLF) 810. The SLF 810 provides information about the HSS 722 that is associated with a particular user profile. It is generally implemented using a database. If the IMS 104 contains more than one HSS 722, I-CSCF 804 and S-CSCF 806 will communicate with SLF 810 to locate the appropriate HSS 722 based on the user profile.

The IMS 104 also includes the aforementioned TAS 812. As the name implies, the TAS 812, sometimes known in a telephony context only as an application server (AS), is a component used to provide telephony applications and additional multimedia functions. The TAS 812 can include any entity in a telephone network that carries out functions that are not directly related to the routing of messages through the network. Such functions can include, for example, in-network answering machines, automatic call forwarding, conference bridges and other types of applications, including the systems 100 and methods 200, 300, 400, 400 discussed herein.

The IMS 104 also includes a media gateway controller function (MGCF) 814. The MGCF 814 is a SIP endpoint that handles call control protocol conversion between SIP and ISDN user part (ISUP)/Bearer-Independent Call Control (BICC) and interfaces with the SAE GW 712 over Stream Control Transmission Protocol (SCTP). The MGCF 814 also controls the resources in a Media Gateway (MGW) 816 across an H.248 interface (discussed below).

The IMS 104 also includes a (MGW) 816. The MGW 816 is a translation device or service that converts media streams between disparate telecommunications technologies such as POTS, SSB, Next Generation Networks (2G 702, 3G 704, and 4G 706) or private branch exchange (PBX) systems.

Finally, the IMS 104 also includes a public switched telephone network (PSTN) 818. The PSTN 818 is the world's collection of interconnected voice-oriented public telephone networks, both commercial and government-owned. It's also referred to as the Plain Old Telephone Service (POTS). With respect to IP phones 710, for example, the PSTN 818 actually furnishes much of the Internet's long-distance infrastructure. Because Internet service providers (ISPs) pay the long-distance providers for access to their infrastructure and share the circuits among many users through packet-switching (discussed above), Internet users avoid having to pay usage tolls to anyone other than their ISPs.

While several possible examples are disclosed above, examples of the present disclosure are not so limited. For instance, while the systems and methods above are discussed with reference to use with cellular communications, the systems and methods can be used with other types of wired and wireless communications. In addition, while various functions are discussed as being performed on the UE 102 and/or various components on the IMS 104, other components could perform the same or similar functions without departing from the spirit of the invention.

The specific configurations, machines, and the size and shape of various elements can be varied according to particular design specifications or constraints requiring a UE 102, server 500, system 100, or method 200, 300, 400 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   determining, by a processor of a user equipment (UE), that a transceiver on the UE has disconnected from a first call to a public safety answering point (PSAP);
   starting, by the processor, a proactive guard timer set to expire in a predetermined amount of time;
   determining, by the processor, that the transceiver has connected a second call to the PSAP;
   receiving, at the transceiver, an incoming call for the UE while the transceiver is still connected to the PSAP;
   determining, by the processor, whether the proactive guard time has expired; and either:
   activating, by the processor, call-waiting on the UE for the incoming call when the proactive guard timer has not expired; or
   sending, by the processor or the transceiver, the incoming call directly to voicemail if the proactive guard timer has expired.

2. The method of claim 1, wherein the predetermined amount of time is a maximum of 180 seconds.

3. The method of claim 1, wherein determining that the transceiver has connected to the PSAP comprises receiving, at the processor, a signal from a dialer on the UE that 911 has been dialed on the dialer.

4. The method of claim 1, wherein determining that the transceiver has connected to the PSAP comprises:
   receiving, at the processor, a signal from a dialer on the UE including a phone number that has been dialed from the UE; and
   determining, with the processor, that the phone number is included in a list of phone numbers for local PSAPs.

5. The method of claim 1, further comprising:
   determining, by the processor, whether a number associated with the incoming call is associated with the PSAP; and either:
   activating, by the processor, call-waiting on the UE for the incoming call when the proactive guard timer has not expired and the incoming call is associated with the PSAP; or
   sending, by the processor or the transceiver, the incoming call directly to voicemail if at least one of the proactive guard timer has expired or the incoming call is not associated with the PSAP.

6. The method of claim 1, further comprising:
   receiving, at the transceiver, a signal to cause the UE to disconnect from the second call; and
   reactivating call-waiting for incoming calls.

7. A method comprising:
  determining, by a processor of a network entity associated with a telecommunications network, that a user equipment (UE) has disconnected from a first call to a public safety answering point (PSAP);
  starting, by the processor, a proactive guard timer set to expire in a predetermined amount of time;
  determining, by the processor, that the UE has connected a second call to the PSAP;
  receiving, at a transceiver of the network entity, an incoming call for the UE while the UE is still connected to the PSAP;
  determining, by the processor, whether the proactive guard time has expired; and either:
  sending, with the transceiver, the incoming call to the UE when the proactive guard timer has not expired; or
  sending, with the transceiver, the incoming call directly to a voicemail server if the proactive guard timer has expired.

8. The method of claim 7, further comprising:
  determining, by the processor, whether a number associated with the incoming call is associated with the PSAP; and either:
  sending, by the transceiver, the incoming call to the UE when the proactive guard timer has not expired and the incoming call is associated with the PSAP; or
  sending, by the transceiver, the incoming call directly to the voicemail server if at least one of the proactive guard timer has expired or the incoming call is not associated with the PSAP.

9. The method of claim 7, wherein determining that the UE is connected to the PSAP comprises receiving, at the transceiver of the network entity, a session initiation protocol (SIP) message from the UE including a response code indicating that the UE is engaged in a 911 call.

10. The method of claim 7, further comprising:
  receiving, with the transceiver, another SIP message from the UE indicating that the UE has disconnected from the second call to the PSAP; and
  reactivating call-waiting for the UE for incoming calls.

11. The method of claim 7, wherein determining that the UE is connected to the PSAP comprises receiving, at the transceiver of the network entity, a SIP message from the PSAP including a response code indicating that the UE is connected to the PSAP.

12. The method of claim 7, wherein sending the incoming call to the UE activates call-waiting on the UE to enable the incoming call to be accepted or rejected at the UE.

13. The method of claim 7, wherein the network entity comprises a mobile switching center (MSC).

14. The method of claim 13, wherein determining that the UE is connected to the PSAP comprises:
  determining, with the processor of the MSC, a number associated with the second call; and
  determining, with the processor, that the number is included in a list associated with local PSAPs.

15. A user equipment (UE) comprising:
  a processor;
  a transceiver; and
  memory comprising program instructions that, when executed by the processor, cause the processor to:
  determine that the transceiver has disconnected from a first call to a public safety answering point (PSAP);
  start a proactive guard timer set to expire in a predetermined amount of time;
  determine that the transceiver has connected a second call to the PSAP;
  receive, at the transceiver, an incoming call for the UE while the transceiver is still connected to the PSAP;
  determine whether the proactive guard time has expired; and either:
  activate call-waiting on the UE for the incoming call when the proactive guard timer has not expired; or
  send the incoming call directly to voicemail if the proactive guard timer has expired.

16. The UE of claim 15, wherein the predetermined amount of time is a maximum of 180 seconds.

17. The UE of claim 15, wherein determining that the transceiver has connected to the PSAP comprises receiving, by the processor, a signal from a dialer on the UE that 911 has been dialed on the dialer.

18. The UE of claim 15, the program instructions further causing the processor to:
  determine whether a number associated with the incoming call is associated with the PSAP; and either:
  activate call-waiting on the UE for the incoming call when the proactive guard timer has not expired and the incoming call is associated with the PSAP; or
  send the incoming call directly to voicemail if at least one of the proactive guard timer has expired or the incoming call is not associated with the PSAP.

19. The UE of claim 18, wherein the memory further includes a list of numbers associated with local PSAPs; and wherein determining whether the number associated with the incoming call is associated with the PSAP comprises:
  receiving, from the transceiver, the number associated with the incoming call;
  comparing the number with the list of numbers associated with local PSAPs; and
  determining whether the number is included in the list of numbers associated with local PSAPs.

20. The UE of claim 15, wherein the predetermined amount of time is a maximum of 180 seconds.

21. A network entity associated with a telecommunications network comprising:
  a processor;
  a transceiver; and
  memory comprising program instructions that, when executed by the processor, cause the processor to perform acts comprising:
  determining that a user equipment (UE) has disconnected from a first call to a public safety answering point (PSAP);
  starting a proactive guard timer set to expire in a predetermined amount of time;
  determining that the UE has connected to a second call to the PSAP;
  receiving, at the transceiver, an incoming call for the UE while the UE is still connected to the PSAP;
  determining whether the proactive guard time has expired; and either:
  sending, with the transceiver, the incoming call to the UE when the proactive guard timer has not expired; or
  sending, with the transceiver, the incoming call directly to a voicemail server if the proactive guard timer has expired.

22. The network entity of claim 21, the program instructions further causing the processor to perform acts comprising:

determining, by the processor, whether a number associated with the incoming call is associated with the PSAP; and either:

sending, by the transceiver, the incoming call to the UE when the proactive guard timer has not expired and the incoming call is associated with the PSAP; or sending, by the transceiver, the incoming call directly to the voicemail server if at least one of the proactive guard timer has expired or the incoming call is not associated with the PSAP.

23. The network entity of claim 21, wherein determining that the UE is connected to the PSAP comprises receiving, at the transceiver, a session initiation protocol (SIP) message from the UE including a response code indicating that the UE is engaged in a 911 call.

24. The network entity of claim 21, the program instructions further causing the processor to perform acts comprising:

receiving, with the transceiver, another SIP message from the UE indicating that the UE has disconnected from the second call to the PSAP; and reactivating call-waiting for the UE for incoming calls.

25. The network entity of claim 21, wherein sending the incoming call to the UE activates call-waiting on the UE to enable the incoming call to be accepted or rejected at the UE.

26. The network entity of claim 21, wherein the network entity comprises one of a proxy call session control function (P-CSCF) or a mobile switching center (MSC).

* * * * *